July 16, 1963
T. R. ROSENBERGER
3,098,147
ARC WELDER BACK-UP WHEEL
Filed Oct. 31, 1961
2 Sheets-Sheet 1
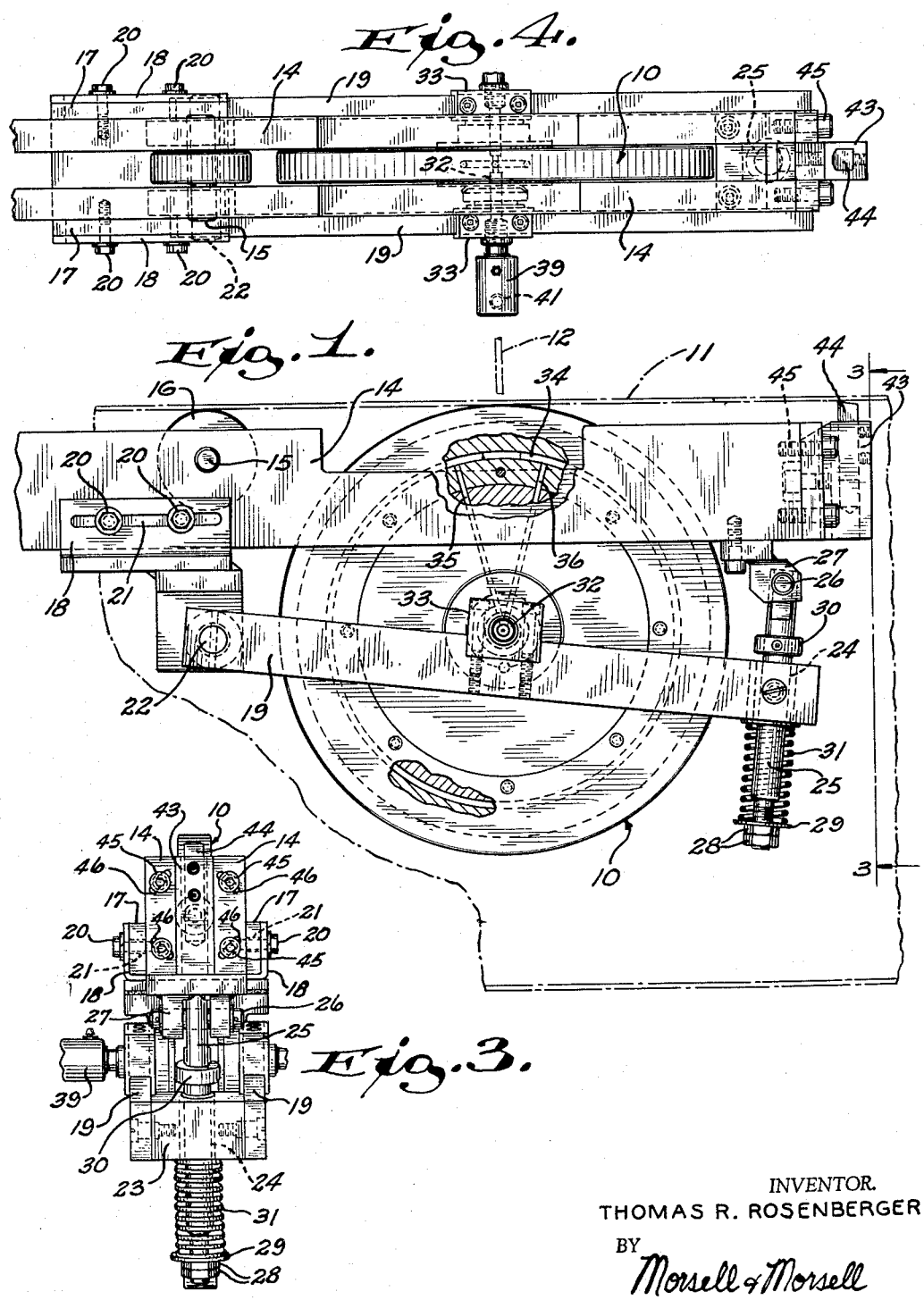
INVENTOR.
THOMAS R. ROSENBERGER
BY
*Morsell & Morsell*
ATTORNEYS.

July 16, 1963 T. R. ROSENBERGER 3,098,147
ARC WELDER BACK-UP WHEEL
Filed Oct. 31, 1961 2 Sheets-Sheet 2
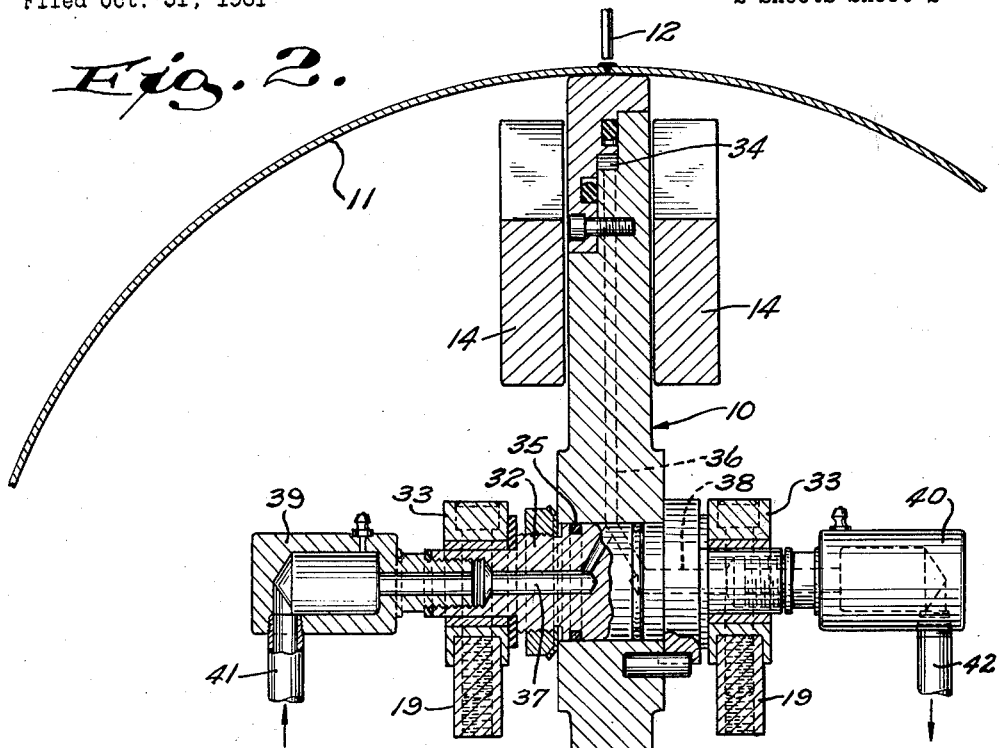
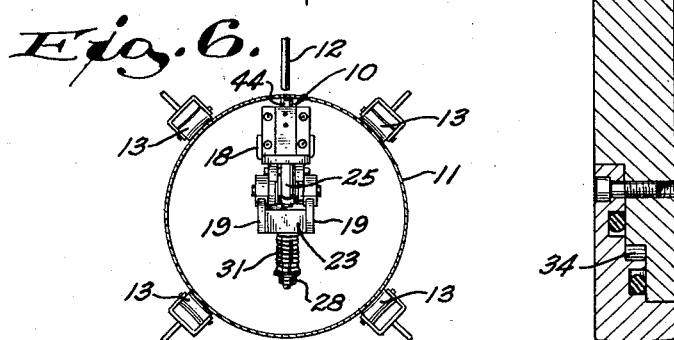
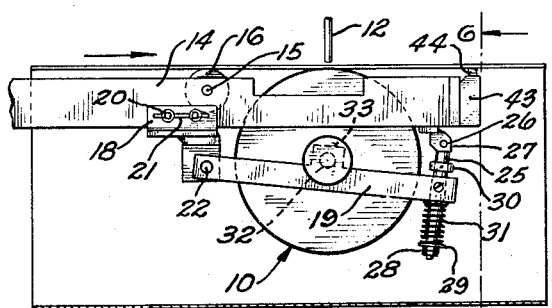
INVENTOR.
THOMAS R. ROSENBERGER
BY
Morsell + Morsell
ATTORNEYS.

United States Patent Office 3,098,147
Patented July 16, 1963

3,098,147
ARC WELDER BACK-UP WHEEL
Thomas R. Rosenberger, Fredonia, Wis., assignor to Banner Welder, Inc., Milwaukee, Wis., a corporation of Wisconsin
Filed Oct. 31, 1961, Ser. No. 148,938
3 Claims. (Cl. 219—60)

This invention relates to improvements in arc welder back-up wheel assemblages.

Heretofore, in the arc welding of longitudinal seams on tanks or boilers, the tank or boiler was advanced longitudinally adjacent the welding torch with the tank or boiler being supported by a shoe positioned interiorally of the seam to be welded. The conventional supporting shoe served a back-up function and to some extent flattened the seam of welding, but to provide a satisfactory welded joint it was subsequently necessary to grind and sand the welded joint on the inner surface of the tank or boiler.

With the foregoing in mind, it is the primary object of the present invention to provide an arc welder back-up wheel assemblage which will permit easy advancement of the object whose seam is to be welded and which will serve more efficiently as a back-up or supporting device and additionally incorporates a tool or scraper to remove the excess material on the inside of the seam while the metal is still hot and soft, eliminating the necessity for subsequent grinding and sanding.

A more specific object of the invention is to provide an arc welder back-up assemblage wherein a freely turnable wheel acts as the back-up or supporting instrumentality, which wheel is efficiently water cooled.

A further object of the invention is to provide an arc welder back-up wheel assemblage wherein the wheel is supported adjacent the inner surface of the seam on the object to be welded by means of an adjustable resilient support.

A further object of the invention is to provide an arc welder back-up wheel assemblage to which a hollow object such as a tank or boiler may be readily applied and manipulated, and which firmly engages the inner side of the object to be welded adjacent the seam and flattens the weld and simultaneously removes the excess material tending to bulge along the interior of the seam.

A further object of the invention is to provide an arc welder back-up wheel assemblage which is completely adjustable relative to the work, which is strong and durable, which is efficient in operation and facilitates the formation of superior welded seams, and which is well adapted for the object set forth.

With the above and other objects in view, the invention consists of the improved arc welded back-up wheel assemblage, and its parts and combinations as set forth in the claims, and all equivalents thereof.

In the accompanying drawings in which the same reference characters indicate the same parts in all of the views:

FIG. 1 is a side view of the improved arc welder back-up wheel assemblage with parts broken away and in section, the water connection fittings for the wheel being omitted and there being a broken line showing of an applied tank whose seam is to be welded;

FIG. 2 is an enlarged transverse vertical sectional view through the arc welder back-up wheel assemblage showing a fragment of a tank applied thereto for the welding of the seam of the latter;

FIG. 3 is an end view of the arc welder back-up wheel assemblage taken approximately along line 3—3 of FIG. 1;

FIG. 4 is a plan view of the arc welder back-up wheel assemblage with the water connection fittings for the wheel omitted;

FIG. 5 is a semi-schematic side view, on a reduced scale, of the back-up wheel assemblage with a tank applied thereto; and FIG. 6 is a transverse sectional view taken on line 6—6 of FIG. 5.

Referring now more particularly to the drawings, it will appear that a relatively large wheel, generally indicated by the numeral 10, forms the back-up support for a tank, boiler or other structure 11 whose longitudinal seam is to be welded by conventional arc welding equipment having an electric welding torch 12. The tank 11 may be engaged by adjustable roller supports 13, which form no part of the present invention, or other suitable means, which will facilitate longitudinal advancement of the tank 11 or the like relative to the welding tool 12. The wheel 10 will be described in detail hereinafter.

As will best appear from FIGS. 1, 4 and 5, a pair of longitudinally spaced apart, but connected, supporting bars 14 are arranged so that the upper peripheral portion of the wheel 10 extends therebetween and above the top surfaces of said bars, the top peripheral portion of the wheel being adapted to firmly engage the under surfaces of the tank or boiler 11 below the seam therein which is to be welded. Also, remote from the wheel 10 there is journaled between portions of the bars 14 on a transverse shaft 15 a roller 16 which also engages the under surfaces of the structure 11 to be welded and facilitates longitudinal advancement of the latter relative to the welding torch 12. It should be understood that the left hand ends of the supporting bars 14, relative to FIGS. 1, 4 and 5, extend and are anchored to some supporting structure (not shown), the opposite or right hand ends of the bars 14 being unobstructed so as to permit the tank or boiler being slid from that end onto the back-up wheel assemblage and to be subsequently advanced in the direction of the arrow in FIG. 5 so that the welding of the seam will be progressively accomplished.

Longitudinally adjustably depended from the spaced apart bars 14 by means of a slide bracket 18 with interposed blocks 17 are a pair of pivotal arms 19. The bars 14 carry outwardly projecting headed bolts 20 extending through slots 21 in the bracket 18 and blocks 17 whereby when said bolts are loosened, the brackets 18, carrying the arms 19, may be adjusted longitudinally for proper positioning of the wheel 10 relative to the work. The pivotal connection for the inner end portions of the arms 19 relative to the bracket 18 is designated by the numeral 22. The outer ends of the arms 19 are joined by a transverse bar 23 having a sleeve-equipped vertical bore 24 therein to slidably receive a post 25 pivotally connected at its upper end, as at 26, to bearing brackets 27 rigidly depended from the supported bars 14. The lower end portion of the post 25 is threaded and carries adjusting nuts 28 and a washer 29. A confined coiled spring 31, surrounding the lower portion of the post, is seated on said washer and engages the arms 19 to urge the same upwardly on the post, such movement being limited by a collar 30 adjustably carried by the post spacedly over the arms 19.

The wheel 10 is centrally revolubly mounted on an axle 32 whose opposite outer end portions are rigidly mounted in blocks 33 affixed to intermediate portions of the arms 19. Therefore, the wheel is free to turn on the axle 32 which is carried by the arms 19 and the arms in turn are yieldingly urged upwardly into contact with the work by the springs 31.

As is shown in FIG. 2, it is desirable that the back-up wheel 10 be water cooled and for that purpose the interior of the wheel is formed with a circular water duct 34 connected with spaced apart radial ducts 35 and 36. Duct 35 connects with a supply duct 37 and duct 36 connects with a discharge duct 38, both of which extend in opposite directions axially through the axle 32. As is shown only in FIG. 2, the opposite outer end portions of the axle 32 have connected thereto hollow pipe fittings 39 and 40 respectively, one of which carries a cold water supply pipe 41 and the other of which carries a water discharge pipe 42, the pipe 41 extending to a source of cold water supply (not shown) and the discharge pipe 42 connecting with a water outlet.

With particular reference to FIGS. 1, 3 and 4, it will be observed that the outer end portions of the supported bars 14 carry a tool holder 43 in which there is vertically adjustably mounted a scarfing tool 44. The tool holder 43 is also mounted on the end portions of the bars 14 for arcuate adjustments by means of bolts 45 which enter slots 46 whereby the tool holder may be turned slightly arcuately in one direction or the other to permit the tool 44 to make perfect engagement with the interior surface of the tank or boiler 11. It will furthermore be observed that the scarfing tool 14 has a convex scraping edge curved to conform to the curvature of the surface of the tank being worked on.

The operation of the improved arc welder back-up wheel assemblage should be apparent from an inspection of FIGS. 1 and 5. The support bars 14 have a cantilever mounting whereby the outer ends of said bars are free of obstruction which permits the tank or boiler, whose seam is to be welded, to be slid onto the assemblage from the unobstructed end thereof, so that the relationship of FIGS. 5 and 6 attains. The tank seam to be welded is, of course, uppermost, and in the initial position of the tank on the assemblage, the outer end of the tank (toward the right relative to FIG. 5) is immediately below the welding torch 12, which, when energized, performs the welding operation progressively along the tank seam with the tank being advanced toward the right relative to FIG. 5. The movement of the tank or work on the assemblage is, of course, facilitated by rolling contact of the same with the revoluble back-up wheel 10 and with the wheel 16 and rollers 13. The slide bracket 18 may be adjusted longitudinally on the bars 14, and the arms 19 which carry the back-up wheel 10 are resiliently urged upwardly so as to cause a firm contact as between the upper peripheral portion of the wheel 10 and the inner surface of the work 11. The wheel 10, of course, effectively backs-up the supported work along the seam and due to the pressure thereon, is flattens the weld on the inner side of the seam. As the tank or work 11 is advanced to the right relative to FIG. 5, the scarfing tool 44, which is adjustable, engages the inner surface of the seam and scrapes the same to remove the excess welding material which tends to bulge along the interior of the seam. This function is accomplished while the metal is hot and soft and eliminates the necessity for subsequently grinding and sanding the inner surface of the welded seam. Consequently, when the work is removed from the assemblage, a perfectly smooth welded seam has been accomplished. The back-up wheel 10 is water cooled and this effectively dissipates heat generated during the welding operation.

The improved arc welder back-up wheel assemblage is of simple and novel construction, is adjustable relative to the work, permits the accomplishment of superior welded seams in the supported work, is easily operated, and is well adapted for the purposes described.

What is claimed as the invention is:

1. In combination, a support for an article having a seam to be welded, an arm resiliently depended from the support, a back-up wheel revolubly carried by the arm in a position to peripherally engage and have rolling contact with the under-surface of the supported article adjacent its seam, and a roller revolubly carried by the support to peripherally engage the under-surface of the supported article remote from the engagement of the latter with the back-up wheel.

2. In combination, a support for an article to be welded and along which the article is advanced, an arm pivotally depended at one end from the support, means yieldingly depending the other end portion of the arm from the support, and a back-up wheel revolubly carried by a portion of the arm intermediate the connections for the ends of the arm in a position of peripherally engage and have rolling yielding contact with the under-surface of the supported article adjacent the line of weld.

3. An arc-welder back-up wheel assemblage comprising, a horizontal support for an article having a seam to be welded, said support having a free outer end portion toward which the supported article is advanced, an arm pivotally depended at one end from the support and projecting therebelow, means yieldingly adjustably connecting the outer end portion of the arm to the support, a fluid-cooled back-up wheel revolubly carried by an intermediate portion of the arm in a position to peripherally engage and have rolling contact with the under-surface of the supported article adjacent the line of weld, and a welding tool above the seamed outer surface of the supported article to weld the seam therein as the article is advanced along the support toward the free outer end portion thereof.

References Cited in the file of this patent
UNITED STATES PATENTS

| | | |
|---|---|---|
| 1,886,524 | Chapman | Nov. 8, 1932 |
| 2,146,430 | Hazen | Feb. 7, 1939 |